United States Patent
Tseng

(10) Patent No.: US 6,588,604 B1
(45) Date of Patent: Jul. 8, 2003

(54) STORAGE RACK FOR COMPACT DISCS

(76) Inventor: Chun-Hsien Tseng, No. 3, Ting-Hsi-Hsin, Lu-Man Tsun, Chu-Chi Hsiang, Chiayi Hsien (TW)

(*) Notice: Subject to any disclaimer, the term of this patent is extended or adjusted under 35 U.S.C. 154(b) by 0 days.

(21) Appl. No.: 10/152,915

(22) Filed: May 21, 2002

(51) Int. Cl.[7] .............................................. A47G 29/00
(52) U.S. Cl. ...................................... 211/40; 211/183
(58) Field of Search ...................... 211/40, 41.1, 181.1, 211/50, 10, 11, 41.4, 85.31, 13.1, 1, 183; 248/127, 146, 153, 151; 206/454; D6/458, 462, 566, 407; 312/9.1, 9.9, 9.47, 9.48, 9.53, 9.55, 9.56; 5/110; 297/440.11, 230.11, 452.63

(56) References Cited

U.S. PATENT DOCUMENTS

| | | | | | |
|---|---|---|---|---|---|
| 110,941 A | * | 1/1871 | Vannice | ...................... | 312/196 |
| 415,634 A | * | 11/1889 | Guptill | ...................... | 211/41.4 |
| 1,229,330 A | * | 6/1917 | Sharples | ...................... | 312/9.53 |
| 1,366,203 A | * | 1/1921 | Meyer | ...................... | 312/9.53 |
| 2,825,465 A | * | 3/1958 | Burgo | ...................... | 211/40 |
| 2,948,408 A | * | 8/1960 | Edridge | ...................... | 294/5.5 |
| 2,983,930 A | * | 5/1961 | Porritt | ...................... | 5/110 |
| 3,056,621 A | * | 10/1962 | Edridge | ...................... | 294/5.5 |
| 3,679,261 A | * | 7/1972 | Slabakov | ...................... | 297/230.11 |
| 3,744,644 A | * | 7/1973 | Brosig | ...................... | 211/40 |
| 4,671,415 A | * | 6/1987 | Manhart | ...................... | 211/85.2 |
| 5,358,124 A | * | 10/1994 | Mueller | ...................... | 211/41.12 |
| D396,985 S | * | 8/1998 | Burnett | ...................... | D6/630 |

* cited by examiner

*Primary Examiner*—Daniel P. Stodola
*Assistant Examiner*—Jennifer E. Novosad
(74) *Attorney, Agent, or Firm*—Harness, Dickey & Pierce, P.L.C.

(57) ABSTRACT

A storage rack includes a stand and a string that is wound around the stand to form a plurality of clamping units for clamping casings of compact discs. Each clamping unit includes two parallel first crossing sections of the string disposed at a front side of the stand, and two parallel second crossing sections of the string disposed at a rear side of the stand. Each of the second crossing sections of the clamping unit is inclined relative to the first crossing sections.

4 Claims, 6 Drawing Sheets

STORAGE RACK FOR COMPACT DISCS

BACKGROUND OF THE INVENTION

1. Field of the Invention

This invention relates to a storage rack for compact discs, more particularly to a storage rack with a string that is formed into a plurality of clamping units on the storage rack for clamping casings of compact discs.

2. Description of the Related Art

FIG. 1 illustrates a conventional storage rack 1 for accommodating casings 2 of compact discs. The storage rack 1 includes a base 11, three triangularly disposed posts 12 on the base 11, and a plurality of vertically aligned U-shaped plates 13 that are mounted on the posts 12 and that cooperatively confine a plurality of horizontally extending slots 14 for accommodating the casings 2. The conventional storage rack 1 is disadvantageous in that the casings 2 tend to fall off from the storage rack 1 when the storage rack 1 is accidentally tilted.

SUMMARY OF THE INVENTION

Therefore, the object of the present invention is to provide a storage rack that is capable of overcoming the aforesaid drawback.

According to the present invention, there is provided a storage rack for casings of compact discs. The storage rack comprises: a stand having front and rear sides, a base, and parallel first and second rods extending upwardly and inclinedly in a longitudinal direction from the base; and a string wound around the first and second rods to form a plurality of parallel first crossing sections that are disposed at the front side of the stand, that span the first and second rods, and that are aligned along the longitudinal direction, and a plurality of parallel second crossing sections that are disposed at the rear side of the stand, that span the first and second rods, and that are aligned along the longitudinal direction. Two adjacent ones of the first crossing sections cooperate with the first and second rods to confine an elongated rectangular opening that is adapted to permit passage of a casing of compact disc therethrough. Each of the second crossing sections extends in a diagonal direction relative to the opening confined by a respective adjacent pair of the first crossing sections and the first and second rods and cooperates with an adjacent one of the second crossing sections and the adjacent pair of the first crossing sections to form a clamping unit to clamp the casing thereamong.

BRIEF DESCRIPTION OF THE DRAWINGS

In drawings which illustrate an embodiment of the invention.

DETAILED DESCRIPTION OF THE PREFERRED EMBODIMENT

FIGS. 2 to 6 illustrate a preferred embodiment of a storage rack of this invention for accommodating casings 3 of compact discs.

Figure 1:
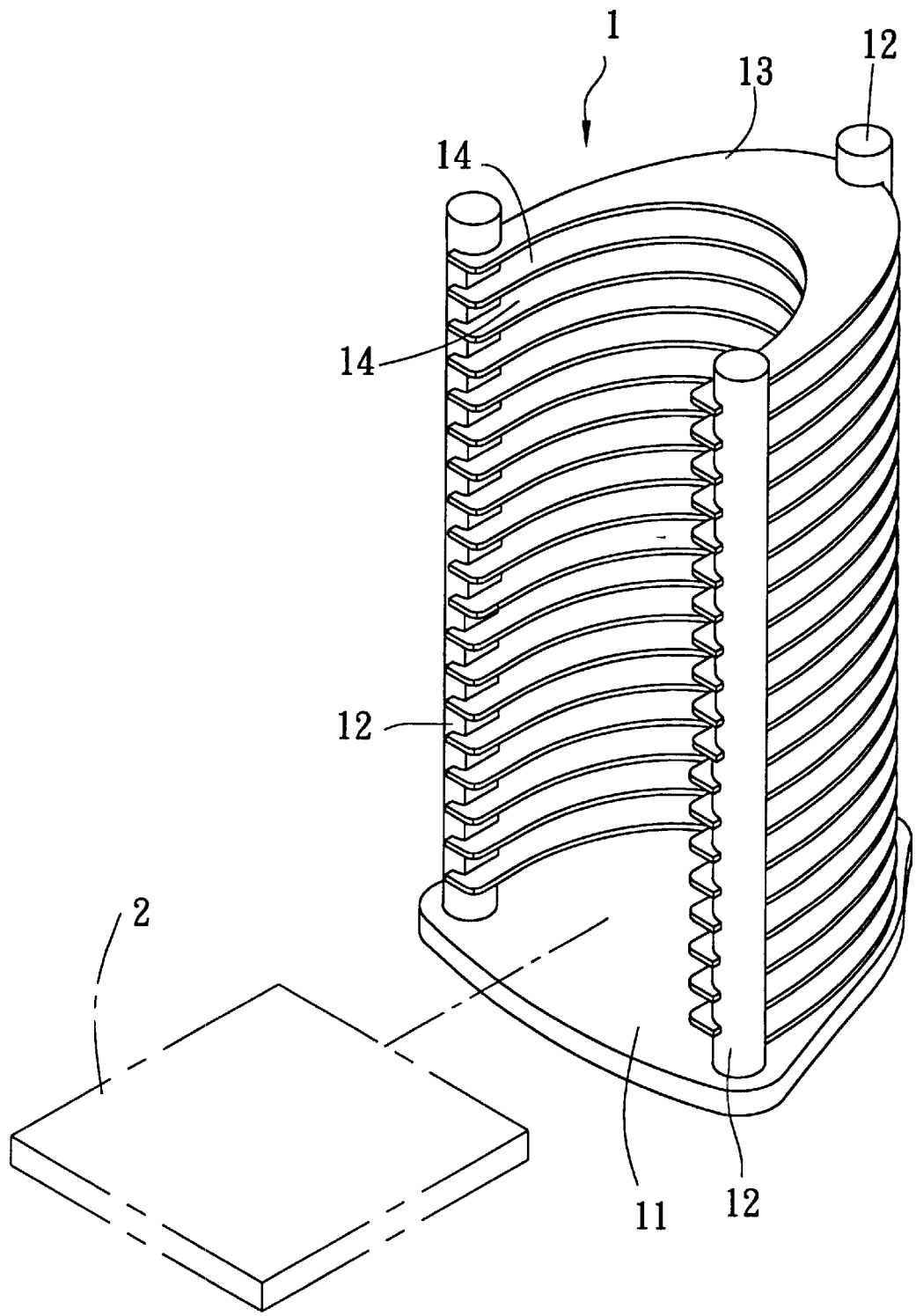
FIG. 1 is a perspective view of a conventional storage rack for compact discs.
Figure 2:
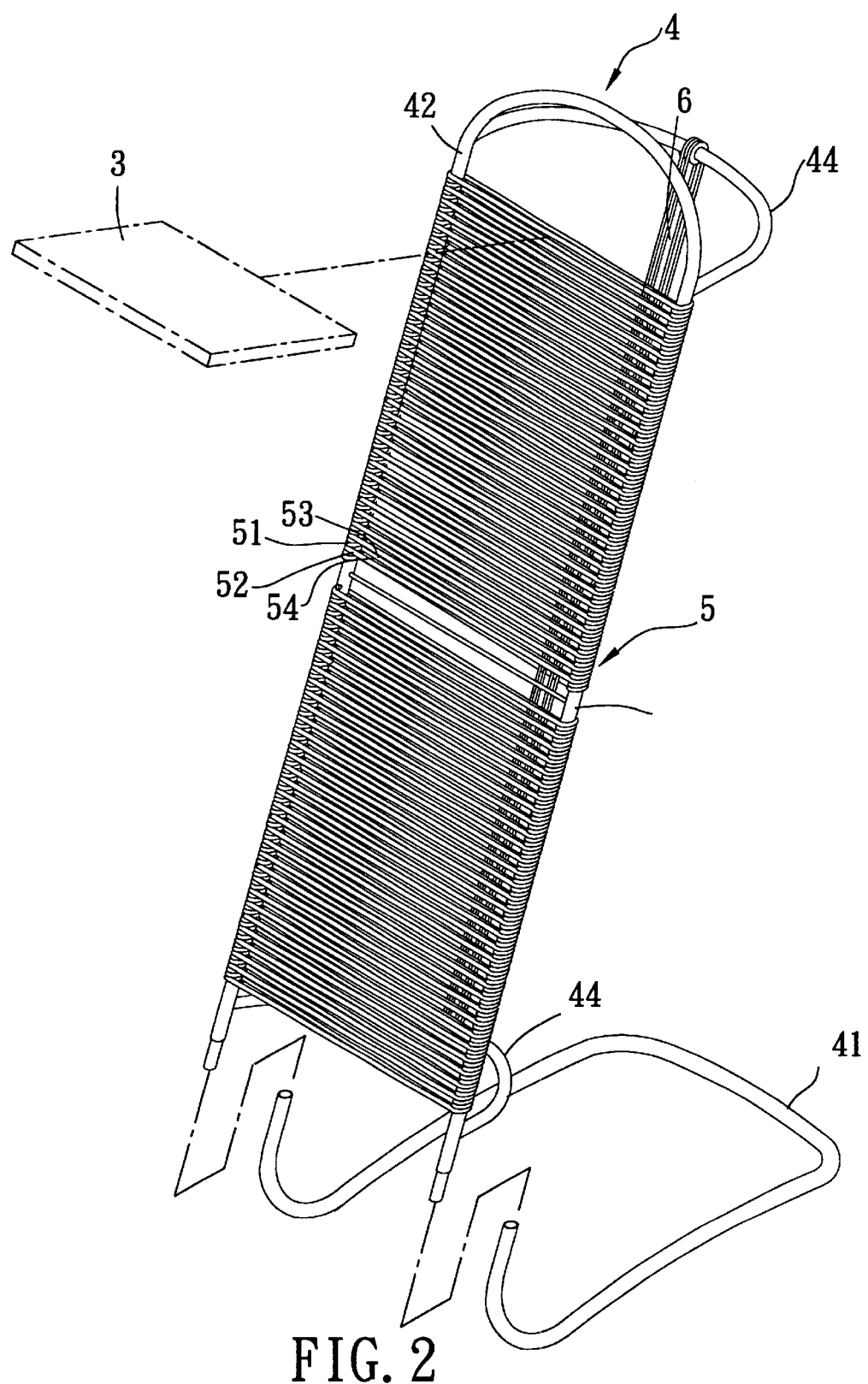
FIG. 2 is a perspective view of a storage rack embodying this invention.
Figure 3:
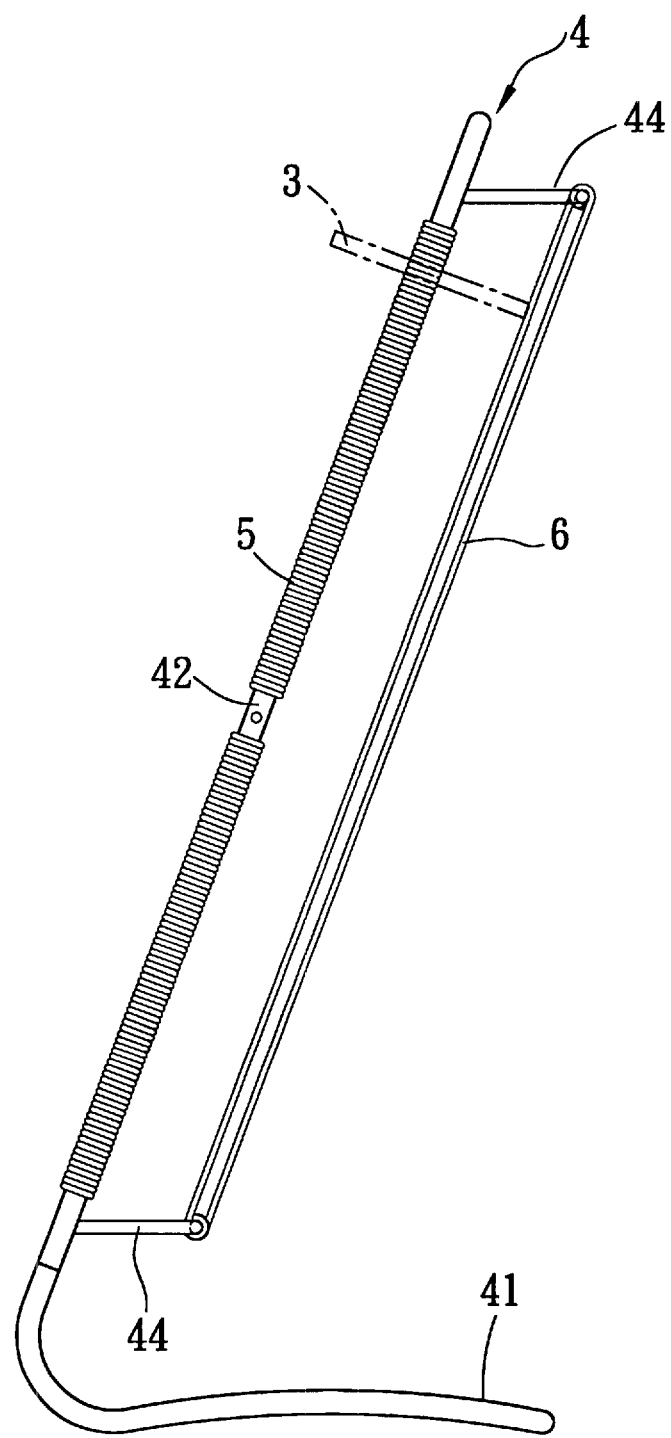
FIG. 3 is a side view of the storage rack of FIG. 2.
Figure 4:
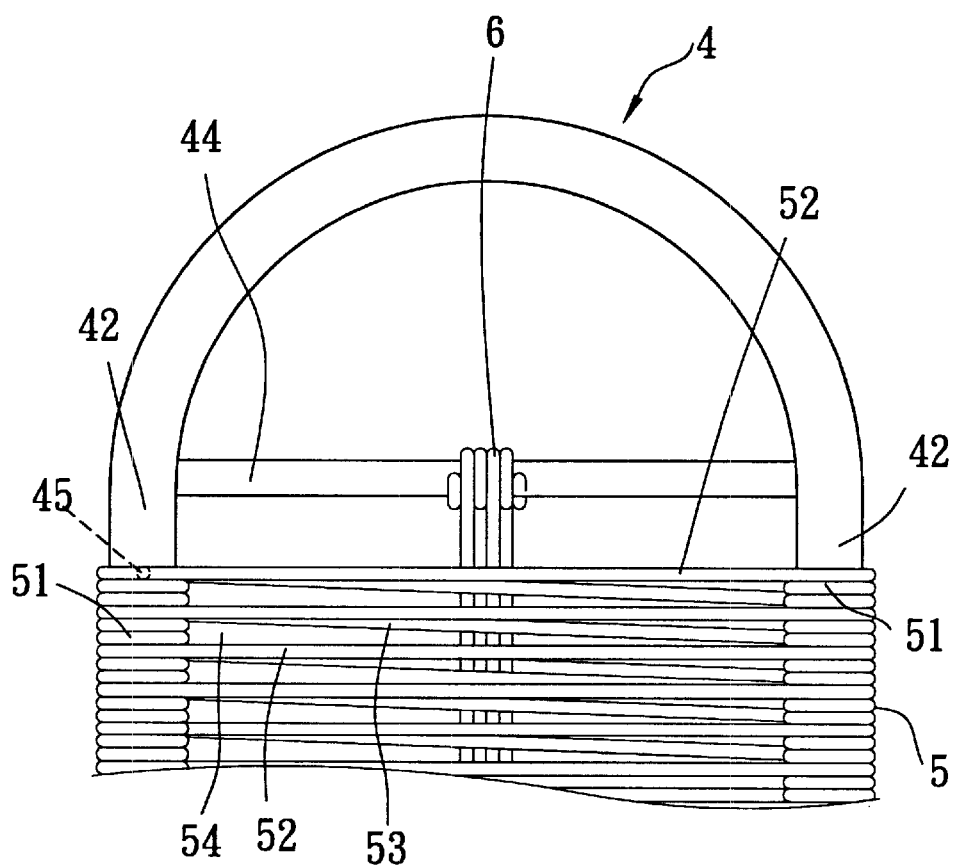
FIG. 4 is a fragmentary front view of the storage rack of FIG. 2.
Figure 5:
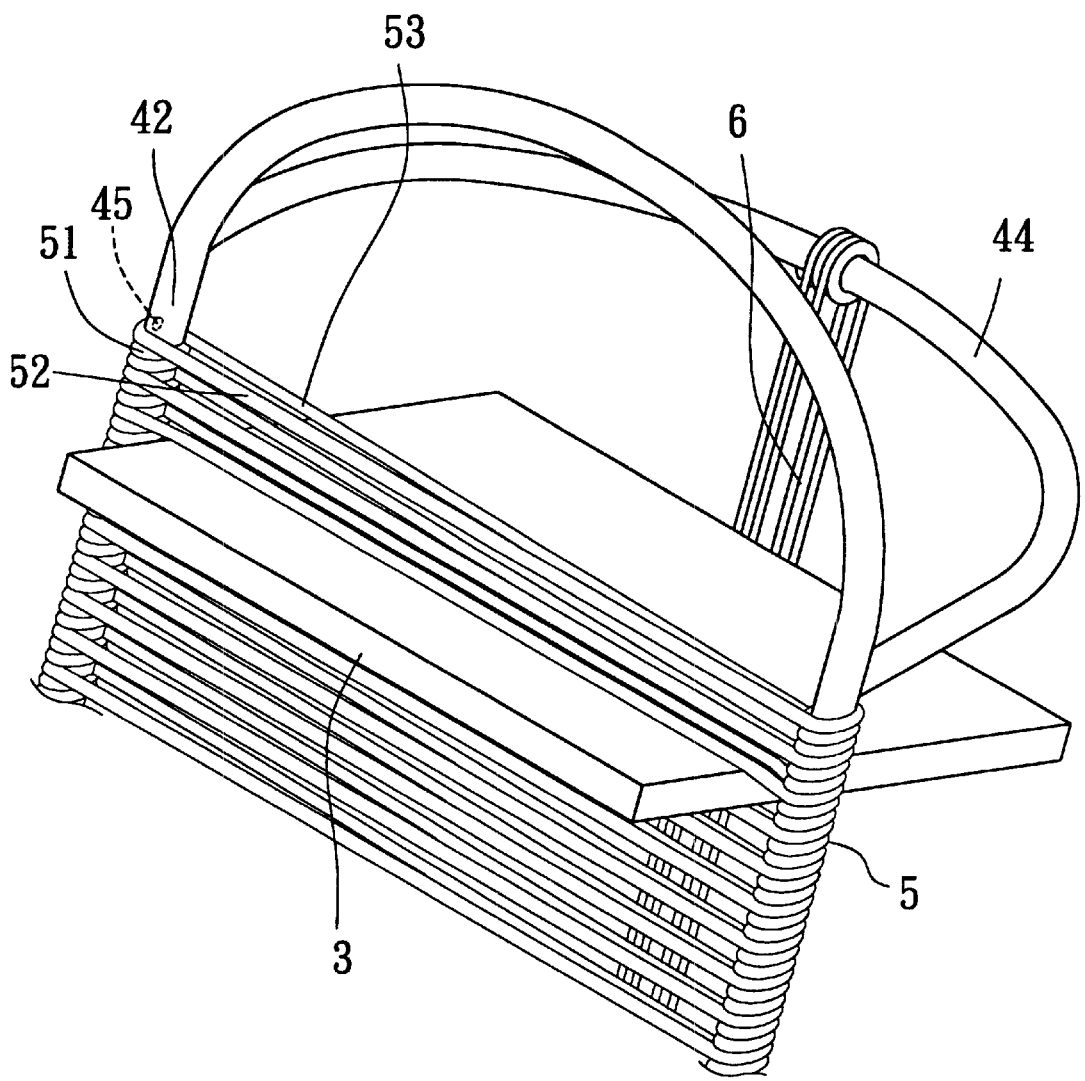
FIG. 5 is a fragmentary perspective view of the storage rack of FIG. 2, with a casing of compact disc accommodated therein.
Figure 6:
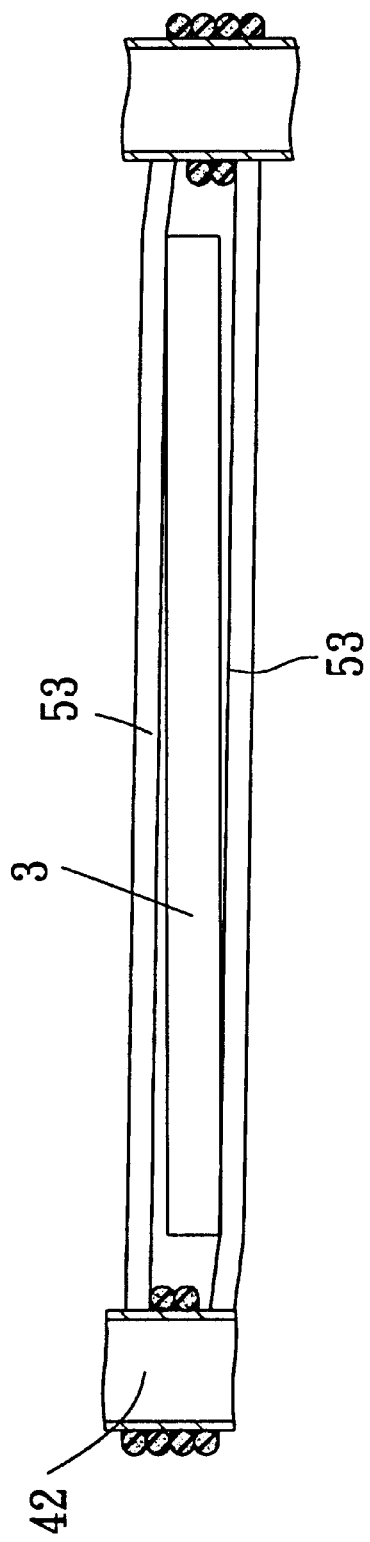
FIG. 6 is a fragmentary sectional view to illustrate how the casing is clamped by a clamping unit formed on the storage rack of FIG. 2.

The storage rack includes: a stand 4 having front and rear sides, a base 41, and parallel first and second rods 42 extending upwardly and inclinedly in a longitudinal direction from the base 41; and an elastic string 5 wound around the first and second rods 42 to form a plurality of parallel first crossing sections 52 that are disposed at the front side of the stand 4, that span the first and second rods 42, and that are aligned along the longitudinal direction, and a plurality of parallel second crossing sections 53 that are disposed at the rear side of the stand 4, that span the first and second rods 42, and that are aligned along the longitudinal direction. Two adjacent ones of the first crossing sections 52 cooperate with the first and second rods 42 to confine an elongated rectangular opening 54 that is adapted to permit passage of a casing 3 of compact disc therethrough. Each of the second crossing sections 53 extends in a diagonal direction relative to the opening 54 confined by a respective adjacent pair of the first crossing sections 52 and the first and second rods 42 so as to cooperate with an adjacent one of the second crossing sections 53 and the adjacent pair of the first crossing sections 52 to form a clamping unit to clamp the casing 3 thereamong. Since the first and second rods 42 are inclined rearwardly, the casing 3 will be inclined downwardly and will be tightly clamped by the respective adjacent pair of the second crossing sections 52 (as best shown in FIG. 6) when inserted through the opening 54.

The string 5 is further formed into a plurality of first and second loops 51 that are wound around the first and second rods 42, respectively, between two adjacent ones of the first crossing sections 52.

Formation of the first and second loops 51 and the first and second crossing sections 52, 53 is carried out by fixing one end of the string 5 in a fixing hole 45 in the first rod 42 (see FIGS. 4 and 5), stretching the string 5 to the second rod 42 in a perpendicular direction relative to the lengths of the first and second rods 42 to form a respective one of the first crossing sections 52, winding the string 5 around the second rod 42 to form the respective second loops 51, stretching the string 5 to the first rod 42 in an inclined direction relative to the respective first crossing section 52 to form a respective one of the second crossing sections 53, winding the string 5 around the first rod 42 to form the respective first loops 51, and repeating the aforesaid steps to form the remainder of the first and second loops 51 and the first and second crossing sections 52, 53 along the lengths of the first and second rods 42.

The stand 4 further has vertically aligned upper and lower U-shaped rods 44 that project rearwardly from the first and second rods 42 in a transverse direction relative to the longitudinal direction. A support 6 includes an elastic rope that extends between the upper and lower U-shaped rods 44 in a direction parallel to the longitudinal direction, and that is disposed between the first and second rods 42 so as to permit leaning of the casing 3 thereon (see FIG. 5).

The base 41, the first and second rods 42, and the U-shaped rods 44 of the stand 4 are separate pieces so that the stand 4 can be disassembled to facilitate packing and transport of the storage rack.

Since the casings 3 are clamped by the clamping units of the rack, the aforesaid drawback as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A storage rack for compact discs, comprising:

a stand having front and rear sides, a base, and parallel first and second rods extending upwardly and inclined in a longitudinal direction from said base; and a string wound around said first and second rods to form a plurality of parallel first crossing sections that are disposed at said front side of said stand, that span said first and second rods, and that are aligned along the longitudinal direction, and a plurality of parallel second crossing sections that are disposed at said rear side of said stand, that span said first and second rods, and that are aligned along the longitudinal direction, two adjacent ones of said first crossing sections cooperating with said first and second rods to confine an elongated rectangular opening that is adapted to permit passage of a casing of a compact disc therethrough, each of said second crossing sections extending in a diagonal direction relative to said opening confined by a respective adjacent pair of said first crossing sections and said first and second rods, and cooperating with an adjacent one of said second crossing sections and said adjacent pair of said first crossing sections to form a clamping unit for clamping the casing therebetween.

2. The storage rack of claim 1, wherein said string is further formed into a plurality of first and second loops that are wound around said first and second rods, respectively, between two adjacent ones of said first crossing sections.

3. The storage rack of claim 1, wherein said stand further comprising vertically aligned upper and lower U-shaped rods that project rearwardly from said first and second rods, said storage rack further comprising a support that extends between said upper and lower U-shaped rods in a direction parallel to the longitudinal direction, that is disposed between said first and second rods, and that is adapted to permit leaning of the casing thereagainst.

4. The storage rack of claim 3, wherein said support includes an elastic rope that is wound around said upper and lower U-shaped rods.

* * * * *